United States Patent [19]
Kwarta

[11] Patent Number: 5,299,028
[45] Date of Patent: Mar. 29, 1994

[54] METHOD AND APPARATUS FOR IMAGE DATA RESOLUTION CONVERSION

[75] Inventor: Brian J. Kwarta, Pittsford, N.Y.

[73] Assignee: Eastman Kodak Company, Rochester, N.Y.

[21] Appl. No.: 784,350

[22] Filed: Oct. 29, 1991

[51] Int. Cl.⁵ .............................................. H04N 7/12
[52] U.S. Cl. ................................... 358/445; 358/448; 358/451; 358/443
[58] Field of Search ............... 358/451, 452, 453, 447, 358/445, 448, 428, 443, 463, 466, 160, 493; 382/47

[56] References Cited

U.S. PATENT DOCUMENTS

| | | | |
|---|---|---|---|
| 4,764,975 | 8/1988 | Inoue | 382/47 |
| 4,841,375 | 6/1989 | Nakajima et al. | 358/466 |
| 4,916,747 | 4/1990 | Arimoto | 358/451 |
| 5,196,934 | 3/1993 | Fleischman et al. | 358/160 |

Primary Examiner—Edward L. Coles, Sr.
Assistant Examiner—Madeleine Nguyen
Attorney, Agent, or Firm—David M. Woods

[57] ABSTRACT

The present invention is an apparatus and method that performs resolution conversion by averaging the pixel data produced by a sensor. The averaging operation includes storing 400 dots per inch (dpi) pixel data in alternating latches 94 and 96, adding the contents of the alternate latches using an adder 98 and dividing by two by transferring the carry and the most significant bits of the addition result to the next stage, thereby accomplishing a shift by right. The averaging includes an average of two adjacent pixels for a 200 dpi output, an average of four adjacent pixels for the 100 dpi output and a rolling average of two pixels for the 300 dpi output, where the rolling average has a repeat cycle of four pixels.

4 Claims, 5 Drawing Sheets

METHOD AND APPARATUS FOR IMAGE DATA RESOLUTION CONVERSION

CROSS REFERENCES TO RELATED APPLICATIONS

This application is related to U.S. applications incorporated by reference herein and entitled Asynchronous, Noncontinuous Video Clock Apparatus and Uniformity Correction And Threshold Or Halftoning Conversion Unit And Method both by Brian J. Kwarta, both assigned to Eastman Kodak Company and now U.S. Pat. No. 5,303,065 and U.S. Ser. No. 07/784,488 now abandoned, respectively.

BACKGROUND OF THE INVENTION

1. Field of the Invention

The present invention is directed to a method and apparatus that converts image or pixel data produced by a sensor of a document scanner at a high resolution into image data at a lower resolution and, more particularly, to a system that averages pixels for conversion from 400 dots per inch to 300, 200 and 100 dots per inch.

2. Description of the Related Art

Typically, documents that are electronically scanned for facsimile transmission can be sent to the receiving apparatus at several different resolutions including at least a high resolution for graphic type documents and a low resolution for text. Documents scanned for electronic printing are typically scanned at the high resolution and printed at a medium resolution. The scanner is generally built with a sensor which will provide the highest resolution in the line direction, that is, across the document in the direction text travels, and with a variable step rate in the orthogonal direction, that is down the document. The variable step rate allows the resolution down the document to be varied as desired. If a low resolution scan is performed, the step rate is performed at the higher speed (lower resolution) and the pixel line data from the sensor, sensed at the higher resolution, must be converted into data at a comparable resolution. Typically the sensor of the scanner samples the document at a resolution of 400 dots per inch (dpi) and transmission or printing of the image typically occurs at 400 dpi, 300 dpi, 200 dpi or 100 dpi. Conventional techniques of reducing the resolution or spatial density of the image produced by the sensor include several techniques. The first, subsampling, is a technique in which pixels are dropped from the image. For example, to obtain a 100 dpi image from a 400 dpi sensor only every fourth pixel is transmitted, that is, three pixels are dropped. To transmit a 300 dpi image 3 pixels are transmitted and the fourth pixel is dropped. To transmit a 200 dpi image every other pixel is transmitted. This first technique is described in U.S. Pat. No. 4,394,693. A second technique is to use a one dimensional or a two dimensional nearest neighbor algorithm. This technique also selectively either keeps a pixel or drops a pixel depending on the location of the pixel in the output image. The third technique uses linear interpolation in one dimension or bi-linear interpolation in two dimensions. This technique also drops pixel information and only uses pixels on either side of the to be interpolated pixel for the interpolation calculations. A fourth technique is called edge decomposition and is typified by U.S. Pat. No. 4,870,497.

SUMMARY OF THE INVENTION

It is an object of the present invention to provide a low cost resolution conversion apparatus and method that always averages.

It is also an object of the present invention to take advantage of the binary technique of dividing by two by shifting data right to obtain the averages.

It is an additional object of the present invention to obtain a 300 dots per inch image from a 400 dots per inch scan by performing a rolling average.

It is another object of the present invention to provide a reduced frequency clock signal with the reduced resolution pixel data.

The above objects can be accomplished by a conversion apparatus and method that performs resolution conversion by averaging the pixel data produced by a sensor. The averaging includes storing 400 dots per inch (dpi) pixel data in alternating latches, adding the contents of the alternate latches and dividing by two by transferring the carry and the most significant bits of the result to the next stage, thereby accomplishing a shift right (divide) by two. The averaging includes an average of adjacent pixels for a 200 dpi output, an average of 4 adjacent pixels for the 100 dpi output and a rolling average of 2 for the 300 dpi output.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
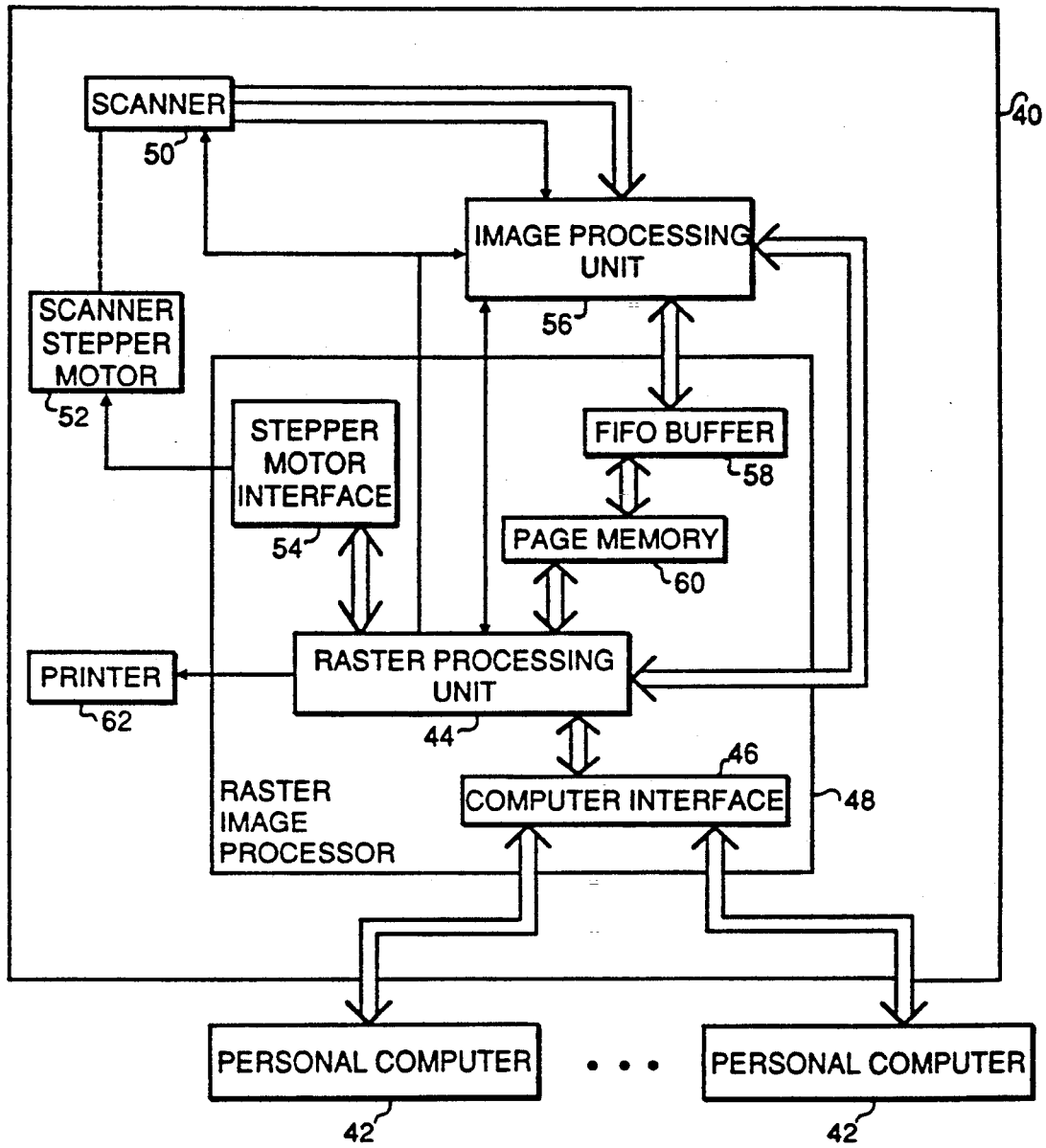
FIG. 1 illustrates the components of a document scanning apparatus 40 including the present invention.

The present invention is part of a scanner apparatus 40 as illustrated in FIG. 1. The scanner apparatus 40 can be part of a printer, an electronic or optical copier, an optical character reader or a facsimile machine. A user at a personal computer 42, or some other type of device, requests that a document be scanned by the scanner apparatus 40. This request is supplied to a raster processing unit 44 through an interface 46, both located in a raster image processor 48. The request indicates the resolution or dots per inch of the scanning operation. The resolution signal is supplied by the raster processing unit 44 to the scanner 46. The raster processing unit 44 initiates the scanning operation which includes scanning a white reference document. The unit 44 also controls a stepper motor 52 through a conventional stepper motor interface 54. A contact array sensor in the scanner 50 samples at a constant resolution (3400 pixels per line) but the sensor is moved by the stepper motor 52 at different speeds depending on the sampling resolution desired. At a resolution of 400 dots per inch the stepper motor moves at 2 inches/second, while at 100 dots per inch it moves at 8 inches/second. The raster processing unit 44 also indicates the resolution of the scan to an image processing unit 56. The scanner 50 scans the white reference document and also scans the document to be digitized and supplies digitized pixel values to the image processing unit 56 along with a horizontal synchronization signal and pixel or video clock signals. The image processing unit 56 performs the resolution conversion and any scaled thresholding or scaled dithering and supplies the converted data to the raster processing unit 44 through a first-in-first-out buffer 58 and a page memory 60. That is, the present invention, which performs the resolution conversion. The page memory 60 should be large enough to hold a converted, binarized image at 400 dots per inch and a 2 megabyte memory is recommended. Once the image is stored in memory 60 it can be output to the computer 42 or to a printer 62 included in the scanner apparatus 40. The printer 62 prints at 300 dots per inch using a photodiode array and an electrostatic belt.

Figure 2:
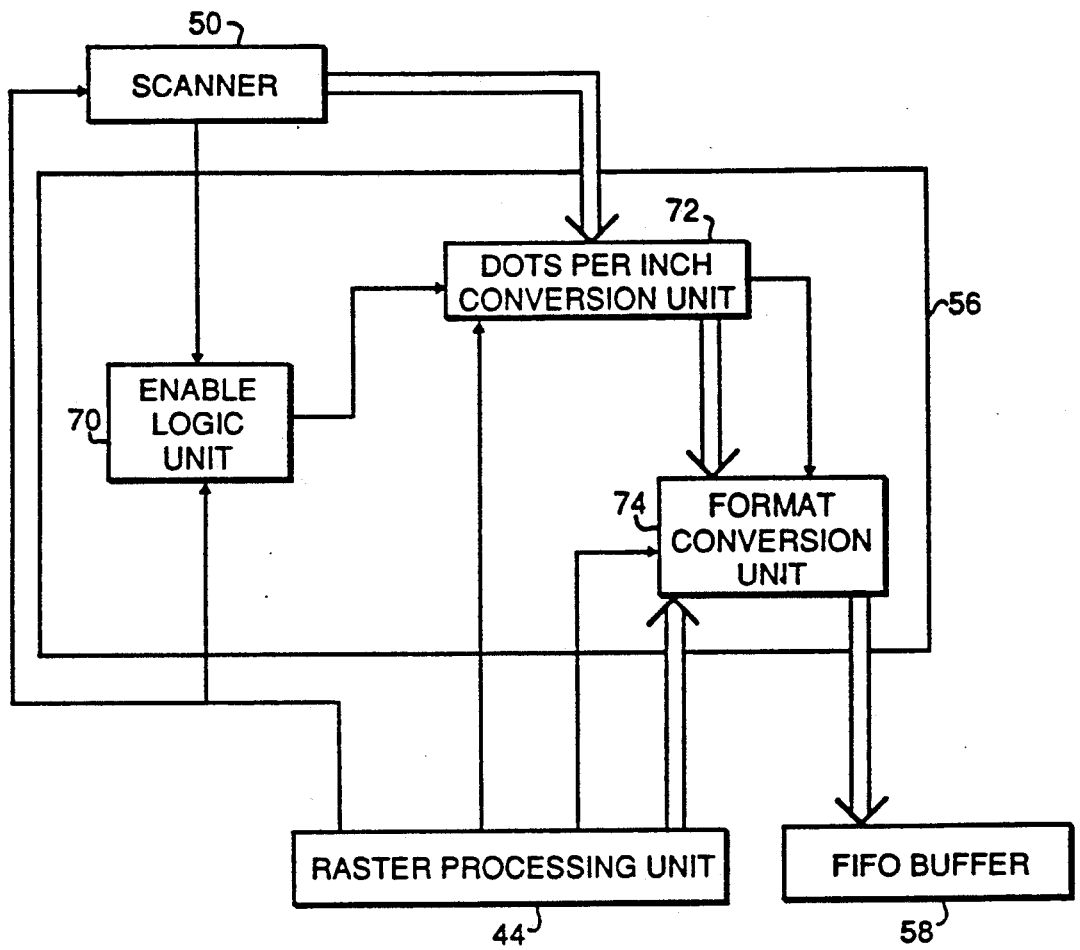
FIG. 2 illustrates the components of the image processing unit 56 of FIG. 1 in more detail.

A more detailed illustration of the components included in the image processing unit 56 can be found in FIG. 2. The image processing unit 56 includes enable logic 70 which receives the horizontal synchronization and pixel clock signals from the scanner 50. The details of how the horizontal synchronization and pixel clock signals are produced can be found in the related Clock Apparatus application previously mentioned. The enable logic 70 based on an enable signal from the raster processing unit 44, supplies the pixel or video clock signal and horizontal synchronization signal to a dots per inch (dpi) conversion unit 72 (See FIG. 4). The enable signal is supplied when the raster processing unit 44 detects that the stepper motor 52 is in the desired position and the logic unit 70 then allows the pixel clock and horizontal synchronization signals to pass through to the dpi unit 72. The dots per inch conversion unit 72 converts the pixel data received from the scanner 50 into pixel data at the desired resolution. The unit 72 supplies pixel data to a format conversion unit 74 along with the pixel clock and the horizontal synchronization signal. The details of the format conversion unit 74 can be found in the related Conversion Unit And Method application previously mentioned. The format converted data that is, the scaled thresholded pixel data or the scaled halftoned pixel data is supplied to the FIFO buffer 58.

Figure 3:
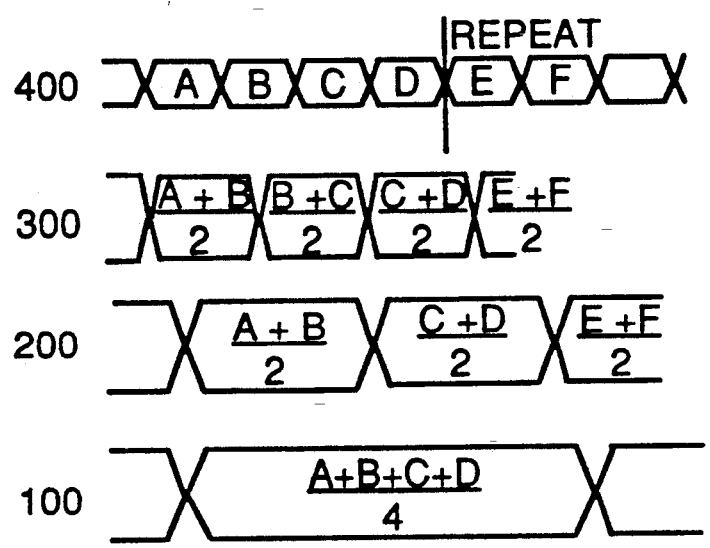
FIG. 3 illustrates the averaging resolution conversion operations of the present invention.

FIG. 3 illustrates the pulse compression averaging method of the present invention. The top timing diagram of FIG. 3 illustrates pixel data being supplied at a 400 dots per inch (dpi) rate. Each of the pixels represented by the letters A–F is a multi-bit pixel grey value, that is, a digital version of the amplitude of the light received by the corresponding pixel in the sensor of the scanner 50. For a 400 dpi image the output of the dpi conversion unit 72 is at 400 dpi. For example, the pixels A–D would be output unchanged by the unit 72 for a 400 dpi image. If a 300 dpi output image is desired, the present invention performs a two pixel rolling average with a repeat cycle of four pixels, such that the average of pixels A and B is output, the average of pixels B and C is output and the average of pixels C and D is output. That is, each pixel appears in two averages because the window used for the average rolls one pixel for each average and the average includes two pixels. The rolling average of pixels D and E is not determined since it falls on a repeat cycle boundary. That is, after the C and D pixel average the next average is of pixels E and F.

When a 200 dpi image is desired, the average is an adjacent pixel average without a rolling window. That is, the average of A and B is output followed by the average of C and D. In a 100 dpi output image the average of 4 pixels is produced. In actual practice the four pixel average is produced by averaging the outputs of the 200 dpi conversion. That is, the 100 dpi conversion operation performs $((A+B)/2+(C+D)/2)/2$.

Figure 4:
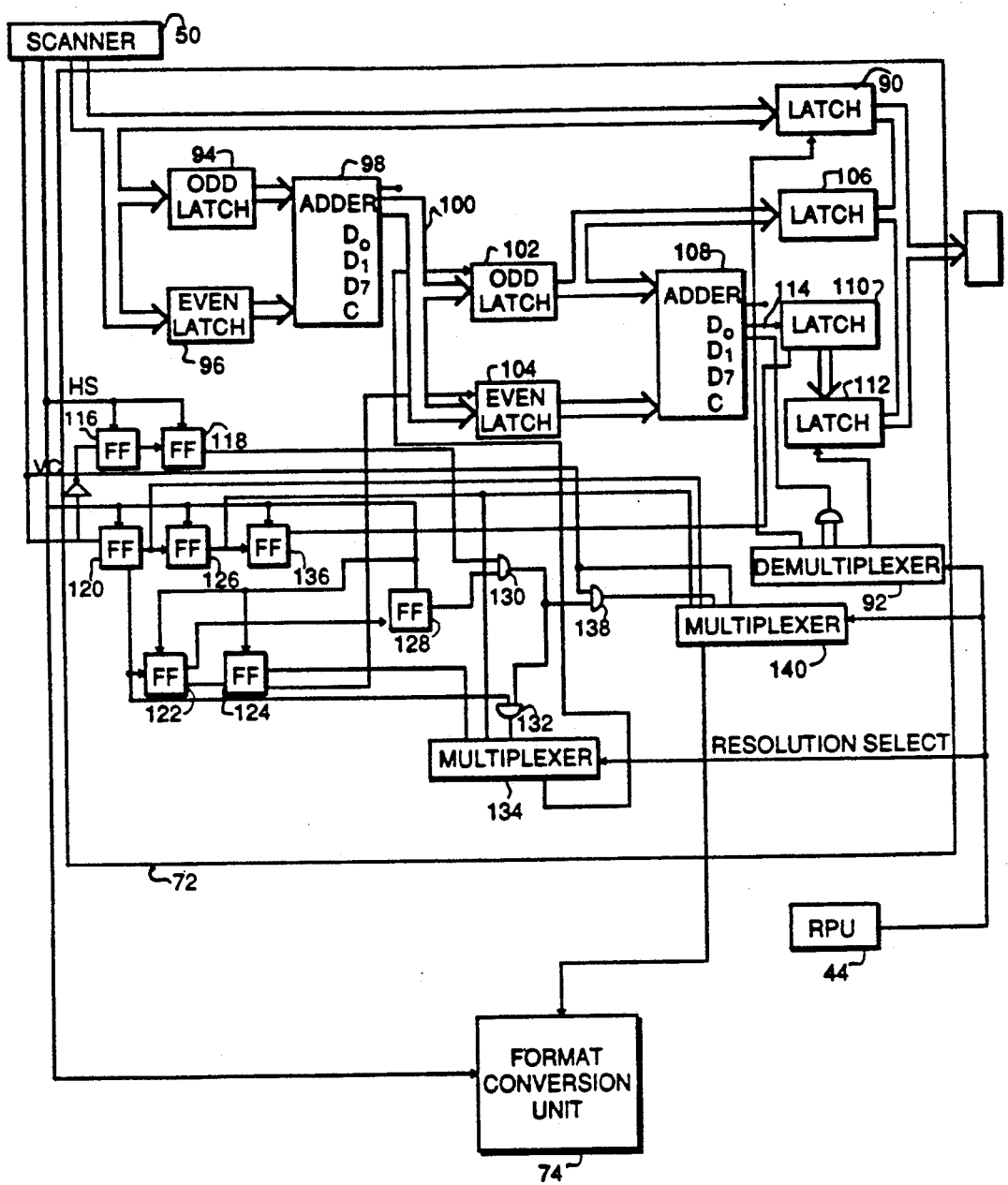
FIG. 4 is a detailed diagram of the dots per inch conversion unit 72.

FIG. 4 illustrates a first embodiment of the conversion unit for providing the 400 to 300, 200 and 100 dpi conversions. The sensor of scanner 50 outputs a series of pixel data values along with a horizontal synchronization signal and a video clock. The horizontal synchronization signal resets the clock logic of the conversion unit 72 and the video clock signal is used to clock the series of sensor pixel values through the various stages of the conversion operation. If a 400 dpi image is desired, the unit 72 transfers the input directly to the output through conventional latch 90 based on a selection of the latch 90 by conventional demultiplexer 92 responsive to a two bit resolution selection signal from the raster processing unit 44. The demultiplexer 92 transfers a ground to the selected latch to indicate a selection. If conversion to 300, 200 or 100 dpi is specified by the two bit resolution selection signal, conventional odd 94 and even 96 latches alternately receive and store the pixel data values from the sensor. For example, the odd latch 94 receives and latches pixels A, C and E while the even latch 96 receives and latches pixels B, D and F. Once both latches 94 and 96 have been loaded with for example, pixel data values A and B, conventional adder 98 adds those values and outputs the result. The output result is shifted right by one bit by connecting bus 100 to the carry and the high order bits of the output. That is, if the pixel values are 8 bit pixel values, the bus would carry bits D1–D7 and C leaving the D0 bit unconnected. The higher order bits D1–D7 and C are connected to the low order input bits of conventional odd 102 and even 104 latches. The output of adder 98 as shifted by bus 100 as the pixels A–F are clocked through the system would be $(A+B)/2$, $(B+C)/2$, $(C+D)/2$, $(D+E)/2$, $(E+F)/2$, etc. Based on the appropriate logic the odd latch 102 stores either $(A+B)/2$, $(B+C)/2$, $(C+D)/2$ etc. or $(A+B)/2$, $(C+D)/2$ etc. such that the odd latch 102 passes either a 300 dpi sequence, by storing every output of adder 98, except at the repeat cycle boundary, or a 200 dpi sequence by storing every other output of adder 98. The conventional latch 106 if selected by the demultiplexer 92 provides the 300 or 200 dpi sequence to the output. If a 100 dpi resolution data sequence is desired, odd and even latches 102 and 104 alternately store the output of adder 98 such that the odd latch 102 produces $(A+B)/2$, $(E+F)/2$ etc. while the even latch 104 produces $(C+D)/2$, $(G+H)/2$, etc. Conventional adder 108 then adds the outputs of the even and odd 102 latches. This output is stored in conventional latch 110 and transferred to the output by conventional latch 112 when selected by the multiplexer 92. As illustrated in FIG. 4, the bus 114 only transfers the high order bits plus the carry to latch 110, thereby providing a divide by 2 (shift right) operation producing the final average. The first stage odd/even latch control signals for latches 94 and 96 are provided by conventional D flip flops 116 and 118. Conventional D flip flops 120–124 provide the latching signal for even latch 104 while latches 120–128 through OR gate 130, AND gate 132 and conventional multiplexer 134 provide the odd latch control signal for latch 102. Conventional D flip flop 136 provides the latching signal for the 100 dpi latch 110. The above-discussed latches in addition to AND gate 138 and multiplexer 140 provide the appropriate 100, 200, 300 or 400 dpi pixel clock signal to the format conversion unit 74 responsive to the resolution selection signal provided by the raster processing unit 44. That is, the selection logic also produces the appropriate frequency clock signal.

Figure 5:
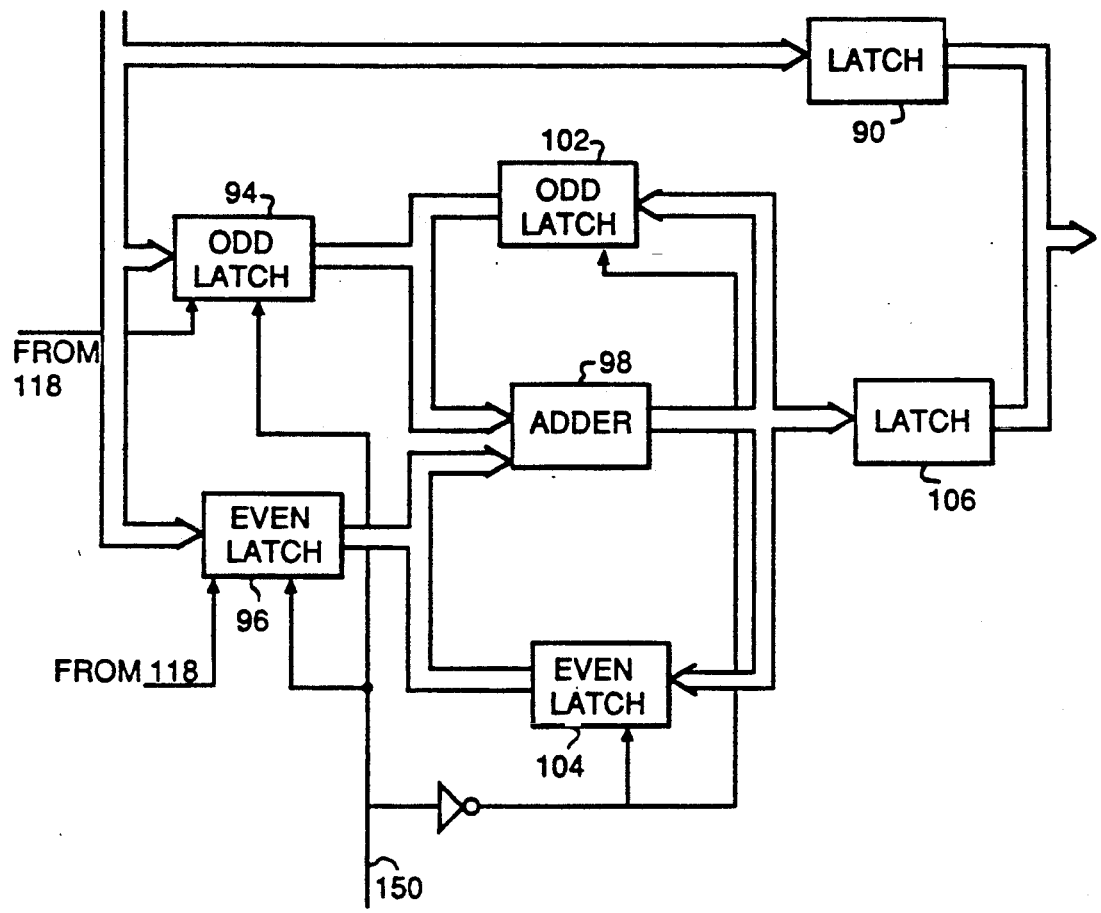
FIG. 5 depicts an alternate embodiment for the dpi conversion unit 72.

FIG. 5 illustrates the components of a second embodiment of the present invention in which the second adder 108 has been eliminated along with latches 110 and 112, and the latches 102 and 104 are arranged in a feedback relationship, so that adder 98 can be reused to produce the 100 dpi sequence. Note that latches 94, 96, 102 and 104 must be conventional tri-state latches since the inputs to adder 98 can be from different latches. The outputs of the tristable latches are enabled as necessary by a ping pong signal on line 150.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An image data conversion apparatus receiving image data, said apparatus comprising:
   a first output latch transferring the image data to an output;
   a first pair of latches receiving the image data;
   a first adder connected to said first pair of latches;
   a second pair of latches connected to said first adder; and
   a second output latch connected to at least one of said second pair of latches.

2. An apparatus as recited in claim 1, wherein said second pair of latches is connected between an output and inputs of said first adder.

3. An apparatus as recited in claim 1, further comprising:
   a second adder connected to said second pair of latches; and
   a third output latch connected to the second adder.

4. An apparatus as recited in claim 3, further comprising:
   selection means, connected to and for selecting said first, second and third output latches and said first and second pairs of latches; and
   clock means for providing a clock signal at a frequency corresponding to a resolution of output image data.

* * * * *